United States Patent [19]

Long

[11] Patent Number: 5,190,572
[45] Date of Patent: Mar. 2, 1993

[54] COMPOSTING METHOD AND DEVICE
[75] Inventor: Richard Long, San Francisco, Calif.
[73] Assignee: Smith & Hawken, Mill Valley, Calif.
[21] Appl. No.: 664,874
[22] Filed: Mar. 5, 1991
[51] Int. Cl.$^5$ .................... C05F 9/06; C05F 17/00; C05F 17/02
[52] U.S. Cl. ........................................ 71/9; 71/1; 422/184; 435/287
[58] Field of Search .................. 71/8, 9, 12, 14, 21, 71/22, 903; 422/184; 435/287

[56] References Cited

U.S. PATENT DOCUMENTS

| | | | |
|---|---|---|---|
| D. 233,748 | 11/1974 | Gordon | D13/1 L |
| D. 241,407 | 9/1976 | Johnson | D7/189 |
| D. 254,951 | 5/1980 | Gedye | D7/192 |
| D. 256,088 | 7/1980 | Gedye | D7/194 |
| D. 258,258 | 2/1981 | Haddock | D7/194 |
| D. 263,365 | 3/1982 | Arato | D34/1 |
| D. 269,046 | 5/1983 | Faul | D34/4 |
| 1,782,675 | 11/1930 | Bayley | 52/192 |
| 2,535,627 | 12/1950 | Earp-Thomas | 98/54 |
| 2,756,541 | 7/1956 | Berger | 47/34 |
| 3,074,583 | 1/1963 | Martinich, Jr. | 220/1 |
| 3,137,095 | 6/1964 | Pearson | 47/33 |
| 3,194,469 | 7/1965 | Rumberger | 229/3.1 |
| 3,240,343 | 3/1966 | Werner | 210/256 |
| 3,456,860 | 7/1969 | Janninck | 229/1.5 |
| 3,847,299 | 11/1974 | Page | 220/4 F |
| 3,951,294 | 4/1976 | Wilson | 220/5 R |
| 4,060,945 | 12/1977 | Wilson | 52/169.5 |
| 4,105,412 | 8/1978 | Petzinger | 23/259.1 |
| 4,108,609 | 8/1978 | Petzinger | 23/259.1 |
| 4,112,644 | 9/1978 | Allen | 52/245 |
| 4,125,394 | 11/1978 | Wilson | 71/9 |
| 4,343,907 | 8/1982 | Graefe | 435/313 |
| 4,352,888 | 10/1982 | Tisbo et al. | 435/287 |
| 4,436,817 | 3/1984 | Nemetz | 435/313 |

OTHER PUBLICATIONS

Rodale's Practical Homeowner, Composters, pp. 22-25, Apr. 1987.
Compostsystems TM, Grass Eliminator I and II, Jan. 1991.
The Wall Street Journal, "Taking the Mystery Out of Composters", Feb. 21, 1991.
Kemp, ComposTumbler TM, 1990.
Good-Prod Sales, Dialene Compost Bin, p. 126.
Sunset, "Keep-It-Moving Bins Make Better Compost".
Burgon & Ball Ltd., Rotoco Gardening Products.
Dalen Products, Inc., Big Bin TM, Traditional Redwood Composter.
Mewaplast, Juwel Express-Wood-Composter.
Mewaplast, Juwel Alu-Composter.
Herkules Sagebock, Gartenartikel.
Biological Resource Technology, Sunbin TM.
Garden Way Manufacturing Company, "10 Key Questions about Compost!", Troy-Bilt, 1986.
Blackwell Products, Tumbler TM, The Aerobic Compost Maker, 1986.
Lescha North America, Ro-Si TM—State of the Art Compost Tumbler.
Yard & Garden Showcase, Ringer Compost Bin, 1990.
Ringer Corporation, Success With Composting, 1988, pp. 1-15.
J. Merryweather, *Barclay Rothschild Manufacturing Ltd.*, "A Sense of Humus, 3 Easy Steps to composting".
Flowtron® Outdoor Products, "Modular Compost Bin".
*Langenbach Catalog*, Soil Saver TM Compost Bin, Summer/Fall 1990, p. 5.
North State Industries, Inc., "Deluxe Composter".
R. D. Raabe, "The Rapid Composting Method", University of CA Leaflet 21251 (Sep. 1981), pp. 1-4.
Horticulture, "Rotating Composter", Jan. 1986.
K-D Wood Products, Inc., "The Law of the 90's: Composter/Backyard Recycler".

*Primary Examiner*—Ferris Lander
*Attorney, Agent, or Firm*—Limbach & Limbach

[57] ABSTRACT

A device and method for composting comprise an assembly of stackable rectangular double walled plastic sub-units. Each sub-unit has four panels which are engaged in an interlocking relationship. Each sub-unit has a plurality of protrusions extending from its top edge, and protrusion-receiving recesses in its bottom edge for receiving the protrusions from an adjacent sub-unit. The composter has a lid with a peripheral ridge on its under side for securely fitting around the top edge protrusions of the uppermost sub-unit. The lid has two half-portions which are centrally attached in a hinged relationship so as to allow opening half of the lid while the other half remains closed.

2 Claims, 5 Drawing Sheets

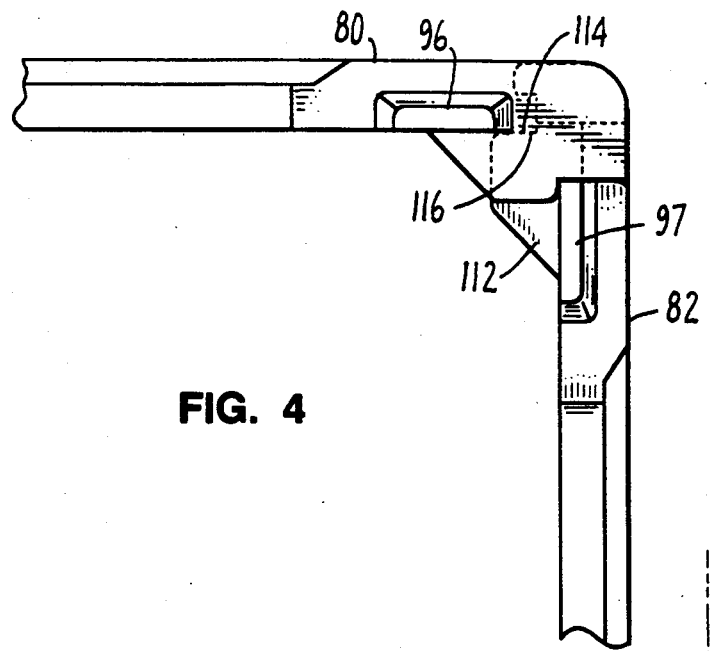
FIG. 4
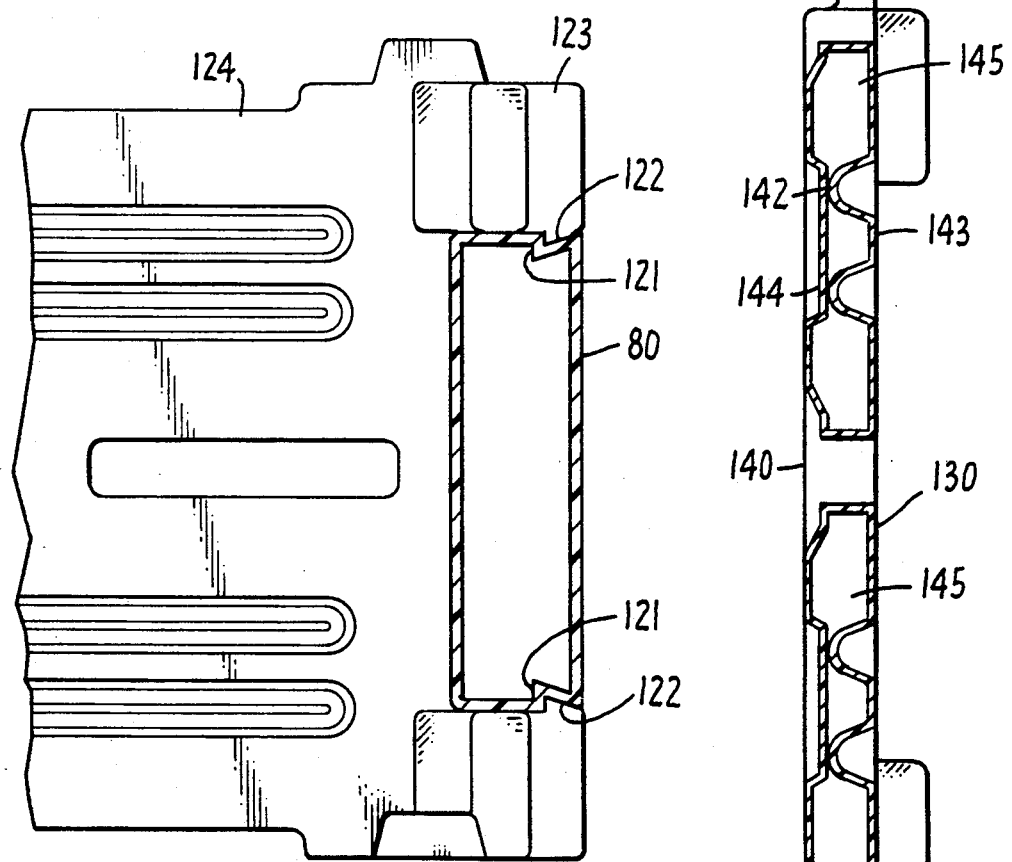
FIG. 5 FIG. 6

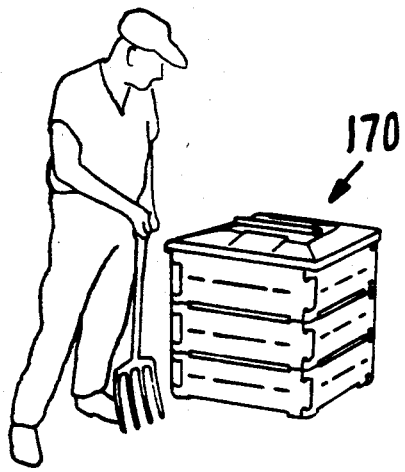
FIG. 9AFIG. 9B
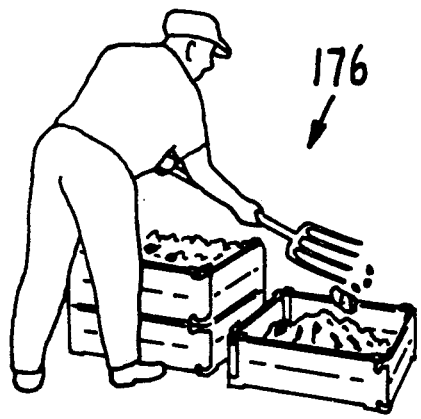
FIG. 9CFIG. 9D

COMPOSTING METHOD AND DEVICE

FIELD OF THE INVENTION

The present invention relates generally to composting of a biodegradable waste. More particularly, the present invention involves a composter having multiple stackable rectangular sub-units which provide volume flexibility, superior insulation and desirable mixing capabilities.

BACKGROUND OF THE INVENTION

Waste disposal is rapidly becoming one of our society's most critical problems. An environmentalist recently commented that the United States waste stream could be cut by 25% if people composted their food and yard wastes. D. Stipp, Wall Street Journal, Feb. 21, 1991, page B1. In addition to the significant advantages of waste recycling, composting provides gardens with an exceptionally rich nutritional source without substantial expense.

Composting is a biochemical process in which organic substances are reduced from large volumes of rapidly decomposable materials to smaller volumes of materials which continue to decompose slowly. In this process, the ratio of carbon to other elements is brought into balance, thus avoiding temporary immobilization of nutrients. One of the many benefits of adding compost to the soil is that the nutrients in it are slowly released to the soil and are then available for use by plants. Decomposition will take place in soil if undercomposed organic materials are added to it, but in the breakdown process nutrients will be tied up and unavailable for plants to use. This may result in nutrient deficiencies and poor growth, especially if large amounts of undercomposed matter is added.

Prior composting methods have involved simply piling organic materials over the earth and letting them stand for long periods of time until the materials were sufficiently decomposed to be ready for use. This method does not require special tools, and minimal time and effort is required to initiate and oversee the process. However, there are disadvantages: ground space is utilized for extended periods; some nutrients will leach away due to exposure to rainfall; and disease producing organisms, weed seeds and insects are not controlled.

Over the years, as the composting process has been studied and become better understood, the major objectives have been elucidated and given rise to various designs for compost containers ("composters").

Heat retention is an important composting requirement, heat being generated by the respiration of microorganisms as they break down the organic materials. Heat retention is enhanced when the compost is held within a container. Composter lids help to further the heat retention objective. However, many existing composter containers have too many vents or holes allowing heat to escape and negating any substantial insulation effects resulting from the container. Prior compost manufacturers have tried to accomplish heat retention by lining the composter with an insulating material. However, the insulator must be non-biodegradable and must allow some aeration from the outside. Even if such materials are available, they add manufacturing complications and increase material costs.

Another important requirement for effective composting is frequent mixing. Because of heat transfer limitations, the center of the compost pile can become extremely hot. If it gets too hot, the microorganisms responsible for the decomposition process will die, the pile will cool, and the whole process will have to start over. Frequent turning and mixing of the pile helps to prevent the overheating problem. Additionally, since the temperature in an unturned compost will be uneven, i.e. hotter toward the middle of the pile, composting rates will vary throughout the pile. Due to heat loss around the margins, only the central portion of the pile is at the optimum temperature. The pile should be turned so that material which is on the outside is moved to the center. In this way, all the material will reach optimum temperatures at various times.

Compost mixing helps to achieve the objective of aeration, which is necessary for effective composting. The objective of aerating the compost competes with the objective of heat containment. If too much non-porous insulation is put around the compost pile to retain heat, it will prevent aeration and suffocate the composting process. On the other hand, if too much external air access is provided, the retained heat will readily escape. Most prior composters suffer from one of these two problems. Nevertheless, composters require some mixing in order to adequately aerate the inner portions of the compost.

Many prior composters are not designed to allow efficient mixing. One attempt to solve this problem involves providing a door or slat on the side of the compost container. However, this design only facilitates mixing of the compost which is adjacent to the opening. Another approach has been to put the compost in a bin which is equipped with a mechanical apparatus for rolling or rotating the bin. While this approach can yield good composting results, it requires extra mechanical parts which complicates production and maintenance.

While general composting goals have been understood in the art, no single compost design has been available prior to the present invention, which simultaneously addresses and adequately solves each of the design considerations of heat containment, mixing flexibility and aeration.

SUMMARY OF THE INVENTION

The present invention provides a device and method for composting. The device of the present invention includes a plurality of stackable rectangular sub-units, each sub-unit comprising four interlocking double walled plastic panels. Each sub-unit has a top edge with protrusions extending upward, and a bottom edge having protrusion-receiving recesses for receiving the top edge protrusions from an adjacent sub-unit. The sub-unit design permits sub-units to be stacked in any height, and the stacking order of the sub-units can be readily changed.

The device of the present invention includes a lid which has an under side with a peripheral ridge dimensioned to circumscribe the top edge protrusions of one of the rectangular units to hold the lid in place while it covers compost which may be contained within the stacked sub-units.

The method of the present invention utilizes a composter according to the device features described above. The device sub-units are stacked between an original bottom sub-unit and an original top sub-unit over a first piece of earth to form a first stack. Next, biodegradable matter is placed into the composter, and allowed to begin decomposing. After decomposition has occurred, the original top sub-unit is removed from the first stack, and placed on a second piece of earth. The original top sub-unit now forms a new bottom sub-unit for a second sub-unit stack. Next, the upper compost layer from the first stack is transferred into the new bottom sub-unit of the second stack. The last two steps of removing the uppermost sub-unit and transferring the corresponding compost layer is then repeated sequentially until the original bottom sub-unit from the first stack becomes the new top sub-unit on the second stack. In the process of reversing the sub-unit stacking order the compost is substantially mixed and aerated, thus promoting uniform decomposition. This restacking process also provides access to the interior of the compost mass where decomposition will usually be most advanced.

BRIEF DESCRIPTION OF THE DRAWINGS

FIG. 4 is a plan view of a sub-unit panel joint in a composter embodiment in accordance with the present invention.

FIG. 5 is a sectional side view of a sub-unit panel joint in a composter embodiment in accordance with the present invention.

FIG. 6 is a cross sectional view through a sub-unit panel in a composter embodiment in accordance with the present invention.

FIGS. 9A-9D are a series of sketches showing how a person can mix compost in accordance with the method of the present invention.

DETAILED DESCRIPTION OF THE DRAWINGS

Figure 1:
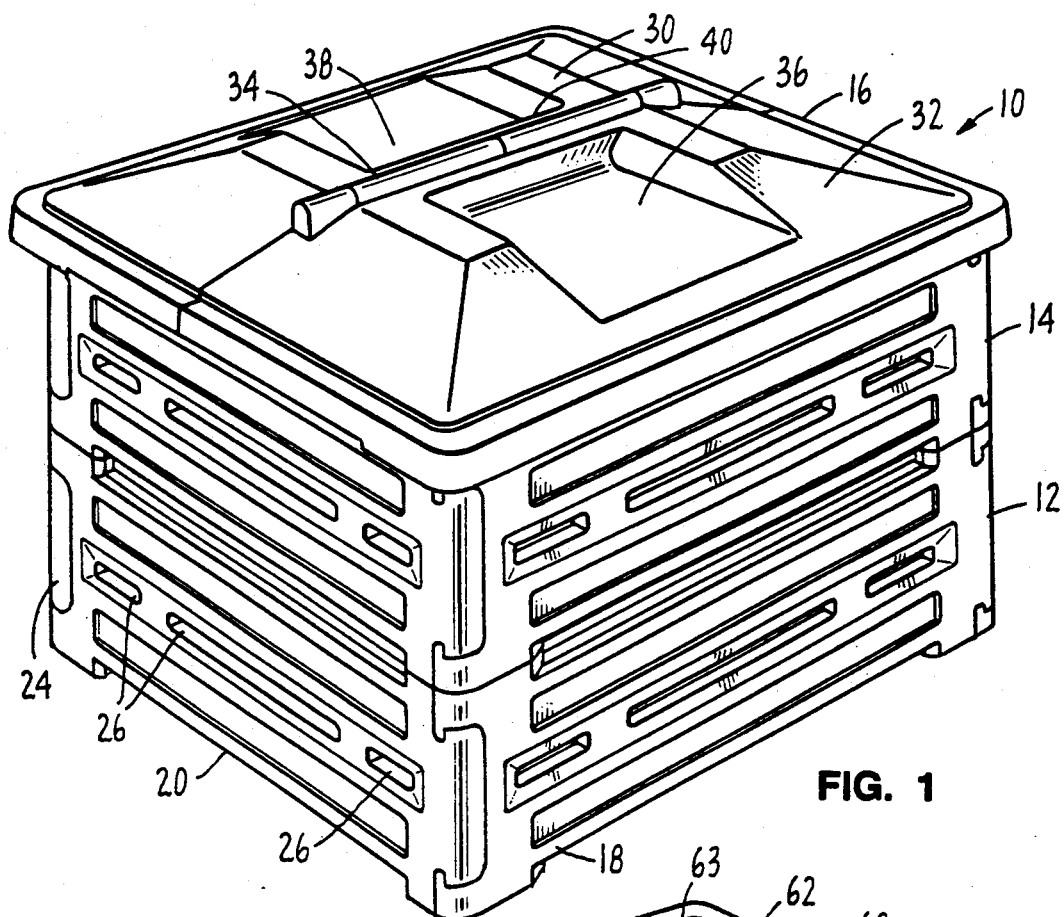
FIG. 1 is a perspective view of a composter embodiment in accordance with the present invention.

The composter of the present invention provides a stackable sub-unit design for maximum flexibility in terms of container volume, mixing capabilities and storage of the device when not in use. According to a preferred embodiment of a composter 10, as shown in FIG. 1, a plurality of sub-units 12 and 14 and a lid 16 are provided. Although the embodiment shown in FIG. 1 has two rectangular sub-units, it will be apparent to the ordinary artisan that any number of sub-units can be stacked to accommodate a specific quantity of compost. In a particularly preferred embodiment three sub-units are stacked together.

Figure 2:
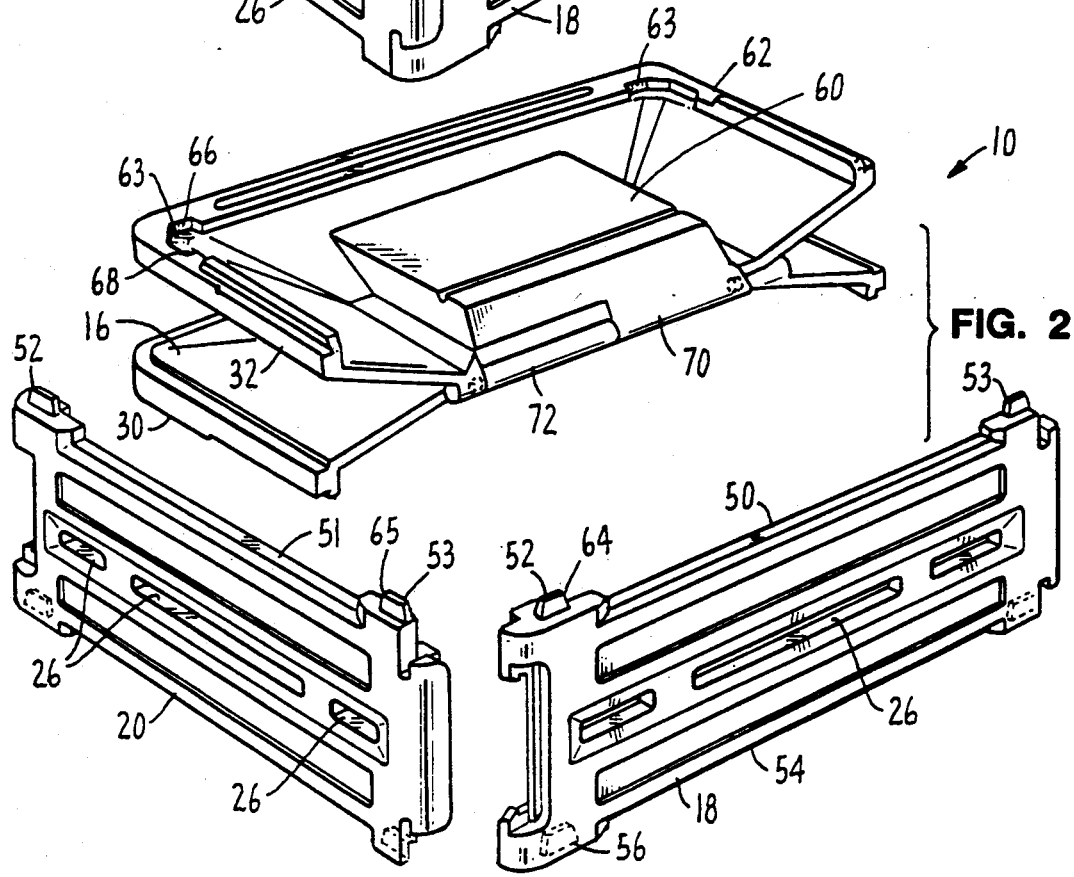
FIG. 2 is a partial perspective exploded view of a composter embodiment in accordance with the present invention.

Each sub-unit 12 is made from four interlocking double walled plastic panels 18 and 20, as shown in FIGS. 1 and 2. In the preferred embodiment, all panels 18 are identical, thus allowing all of the panels to be produced from a single mold. The double walled plastic panel construction contains air pockets inside the panel providing superior insulation. Since heat retention is an important composting requirement, the insulation achieved with double plastic walls is advantageous. A typical sub-unit panel 20 has a T-shaped end 22 and a U-shaped end 24. The T-shaped panel ends 22 are dimensioned to interlock with the U-shaped end 24 of an adjacent panel, as will be more clearly shown below in reference to other drawings. Panel 20 contains vents 26 to permit air access to the compost, since oxygen is an important requirement for compost decomposition.

The lid 16 is rectangular, and has a periphery which is slightly greater than the sub-unit perimeter. As shown in FIG. 1, the lid 16 has two half-portions 30 and 32 which are centrally attached 34 in a hinged relationship. By hinging the lid half-portions in the center, half of the lid can be opened, as shown in FIG. 2, without opening the other half of the lid. This lid design allows a person to access the compost with one hand without having to lift the entire lid off and set it down somewhere else. The lid 16 also has recesses 36 and 38 which cooperate to form a handle 40 when it is desired to remove the entire lid 16.

Sub-unit panel 18 in FIG. 2 has a top edge 50 from which protrusions 52 extend. Similarly, sub-unit panel 20 has a top edge 51 from which protrusions 53 extend. Sub-unit 18 also has a bottom edge 54 with protrusion-receiving recesses 56 for receiving top edge protrusions from another sub-unit which may be stacked below panel 18.

Lid 16 is designed to securely rest on top of sub-unit protrusions 52 and 53. As shown in FIG. 2, lid 16 has an under side 60 and a peripheral ridge 62 dimensioned to circumscribe sub-unit protrusions 52 and 53. In this embodiment, a nest 63 is created for receiving protrusions 52 and 53. Protrusion 52 has an inner face 64 and protrusion 53 has an inner face 65. Lid nest 63 has inner faces 66 and 68. When the lid is closed lid nest inner face 66 butts against panel protrusion inner face 64, and lid nest inner face 68 butts against panel protrusion inner face 65. The protrusion nesting design shown in FIG. 2 provides stabilization for the lid while one lid half-portion is being opened.

The half-portions of lid 16, as shown in FIG. 2, are centrally connected so as to form a hinge 70. Each lid half-portion has a pin (not shown) on its central edge. The pin is dimensioned to fit into one end of a socket 72 of the other lid half-portion, allowing each lid half-portion to independently rotate around the axis of connection between the two lid half-portions. This design allows hinging without requiring any extra parts other than the two lid half-portions. In a preferred embodiment the lid half-portions are identical, allowing both lid portions to be produced from a single mold.

Figure 3:
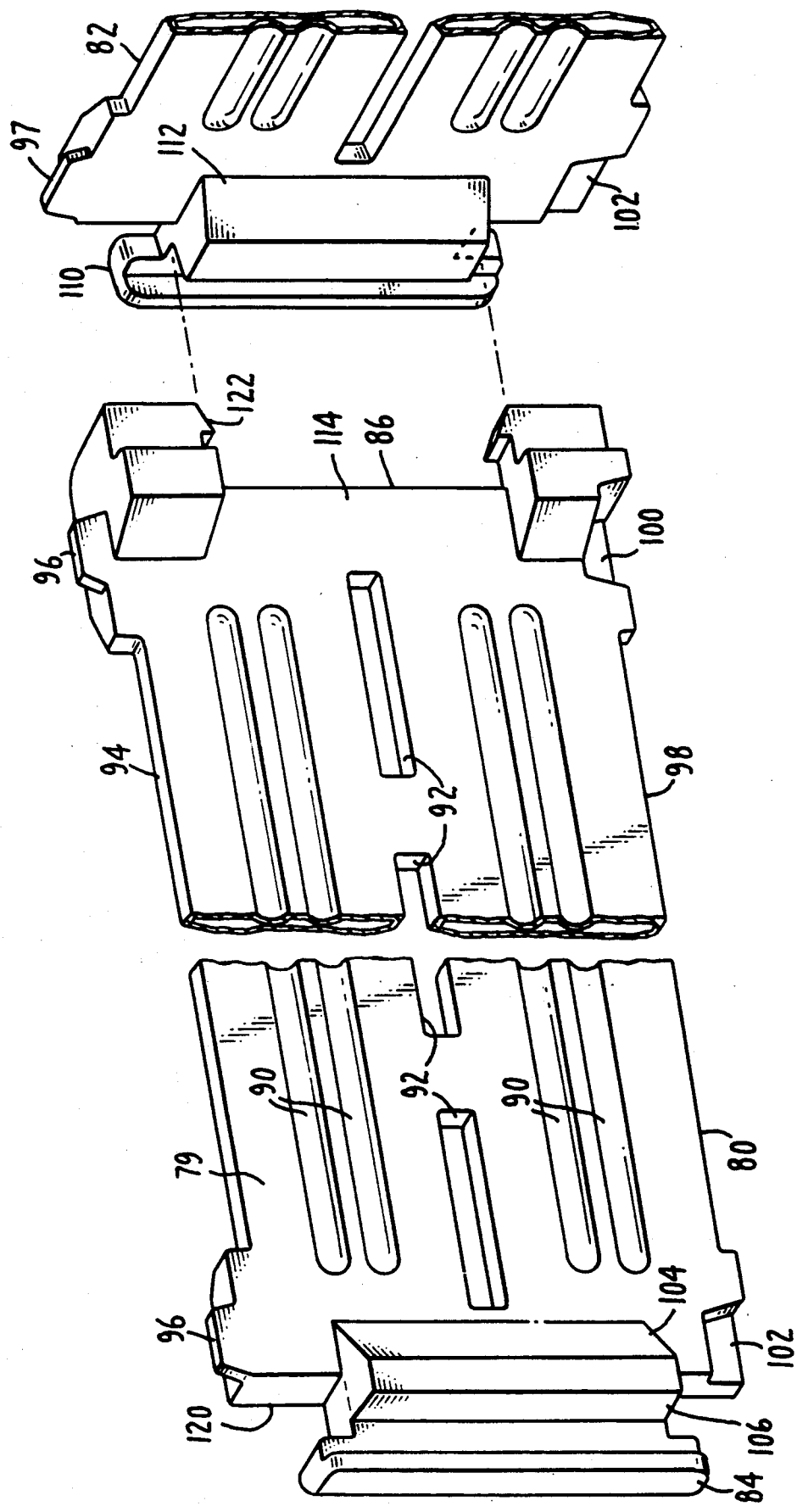
FIG. 3 is a partial perspective view showing an exploded joint between two sub-unit panels in a composter embodiment in accordance with the present invention.

FIG. 3 shows a view of the inner surface 79 of sub-unit panel 80 of an embodiment of the present invention. In this Figure, panel 80 is oriented for interlocking attachment to adjacent sub-unit panel 82. Panel 80 has a T-shaped end 84 and a U-shaped end 86. Panel 80 has interior regions 90 which connect the inner and outer walls of the panel 80 to provide enhanced structural support. Another perspective of these wall-connecting interior regions is shown in FIG. 6, discussed below. The panel has three centrally located vents 92 for air access to the compost contained within the unit.

Sub-unit panel 80 has a top edge 94 from which protrusions 96 extend. Panel 80 also has a bottom edge 98 with protrusion-receiving recesses 100 and 102 for receiving top edge protrusions from an adjacent sub-unit when sub-units are stacked. Panel 80 has a rib 104 with a planar face 106. Where the T-shaped end 84 of panel 80 is interlocked with a U-shaped end of an adjacent panel, the planar face 106 of the panel rib 104 butts against the inner surface of the adjacent panel. Thus, rib 104 provides a brace to help maintain a square joint between the interlocking panels. Similarly, the T-shaped end 110 of panel 82 has rib 112. When panel 80 is connected with panel 82, the planar face of 112 (obscured in FIG. 3) will butt against the inner surface 114 of panel 80, providing a square interlocking joint.

FIG. 4 shows a plan view after sub-unit panels 80 and 82 have been joined. It can be seen that planar face 116 of rib 112 butts against inner surface 114 of panel 80, thus creating a brace for maintaining the square angle of the sub-unit joint.

FIG. 5 is a sectional view which illustrates another advantageous feature of the present invention. The section taken through panel 80 corresponds to plane 120 in FIG. 3. This portion of panel 80 has a lip 121 which interlocks with lip 122 of the U-shaped end 123 of panel 124. The interlocking lips allow the panels to be "snapped" together, simplifying assembly and disassembly.

FIG. 6 shows a cross sectional view through a sub-unit panel 130. Panel 130 has a top edge protrusion 132 for engaging a bottom edge protrusion-receiving recess 134 of an adjacent sub-unit. Similarly, panel 130 has a bottom edge protrusion-receiving recess 136 for receiving a top edge protrusion 138 from an adjacent sub-unit. Panel 130 has a central air vent 140. Interior regions 142 of the panel 130 connect the two walls 143 and 144, providing structural strength for the panel. Spaces 145 between the panel walls 142 and 143 are filled with air to provide good heat retention insulation which enhances the composting process.

Figure 7:
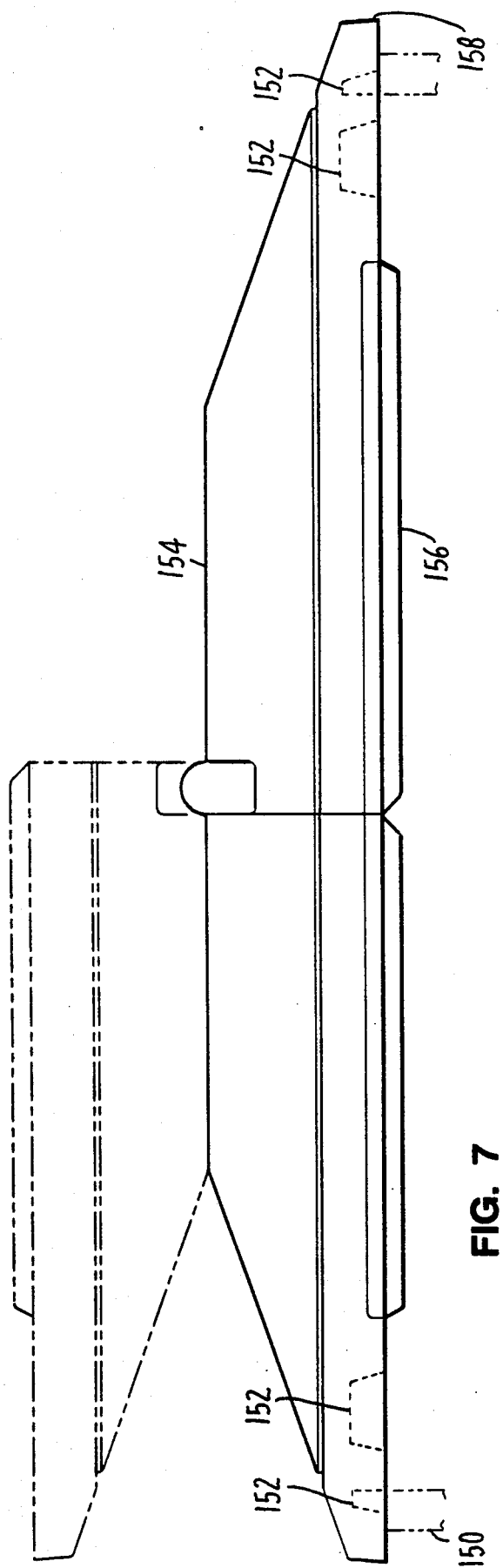
FIG. 7 is a partial side sectional view of a composter embodiment in accordance with the present invention.

A sectional view of a composter embodiment, as shown in FIG. 7, illustrates how a composter lid rests on top of a sub-unit stack. Uppermost sub-unit 150 has top edge protrusions 152. Lid 154 has an under side 156 and a peripheral ridge 158 which is dimensioned to circumscribe sub-unit top edge protrusions 152 so as to hold the lid 154 in place while it covers compost which is contained within the stacked sub-units.

Figure 8:
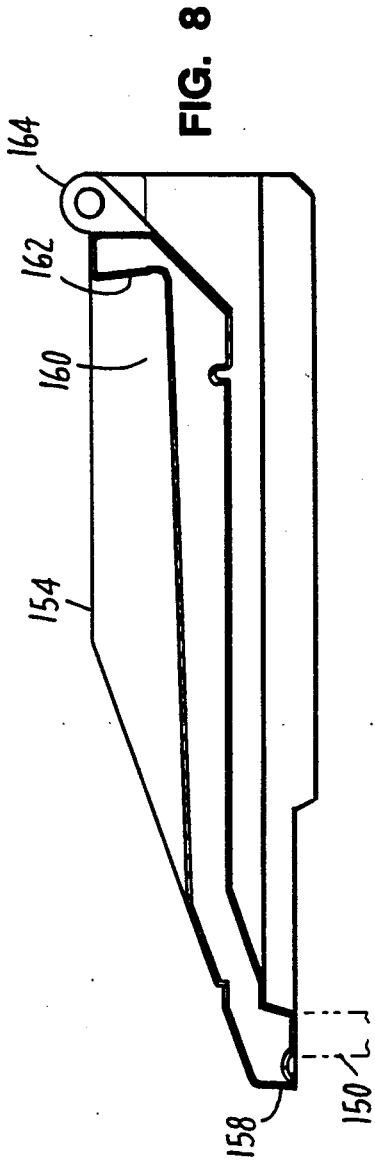
FIG. 8 is a partial side sectional view of a composter embodiment in accordance with the present invention.

FIG. 8 shows a different section of sub-unit 150 and lid 154, illustrating the design of a lid handle in a composter embodiment of the present invention. Lid 154 has two opposing recesses 160 (only one is shown) on its top side. Recess 160 has a concavity 162 defining a handle 164, so that the entire lid may be easily lifted by hand for either removal or replacement.

The preferred composter embodiments described above, as illustrated in the drawings, provide advantageous composting methods and features. For example, the composter of the present invention can be easily transported or stored by breaking it down into separate panels, allowing efficient packing for convenient shipment or storage.

The composter of the present invention can be easily adapted to contain varying compost volumes. It is desireable to minimize the amount of dead air space inside the composter, in order to maximize the natural heating phenomenon which occurs inside the compost. A number of factors may cause the composter volume to change. For example, a person may want to start a compost with relatively little compost material, and gradually add to it as more compost material is accumulated from whatever source. Alternatively, the compost volume will decrease as a person removes the fully composted material, leaving other material to continue decomposing. Moreover, compost matter tends to naturally compact during the composting process. With the composter of the present invention, the container volume can be easily changed to accommodate a changing quantity of compost by adding or removing sub-units as needed.

The sub-unitary design of the composter provides an advantageous compost mixing method. Composter sub-units are stacked between an original bottom sub-unit and an original top sub-unit over a first piece of earth to form a first stack. Biodegradable matter is placed into the composter, and allowed to begin the decomposition process. Decomposition initiators may optionally be added in order to enhance decomposition. After substantial decomposition has occurred the original top sub-unit is removed from the first stack, and placed on a second piece of earth. Depending on how full the composter is, it may be necessary to first remove some of the compost prior to removing the original top sub-unit from the first stack. The original top sub-unit now forms a new bottom sub-unit for a new second stack. The upper compost layer is then transferred into the new bottom sub-unit of the second stack. The last two steps of removing the uppermost sub-unit from the first stack and transferring the uppermost compost layer to the second stack is repeated sequentially until the original bottom sub-unit from the first stack becomes the new top sub-unit on the second stack. In the process of reversing the sub-unit stacking order, the compost is substantially mixed and aerated, thus promoting uniform decomposition. This restacking process provides access to the interior of the compost mass where maximal decomposition occurs.

FIG. 9 illustrates the basic restacking method of the present invention. The method starts with a full composter 170. In this instance, the gardener first removes a portion of the compost on to another piece of earth 172. Next, the gardener removes the uppermost sub-unit and relocates it over the new piece of earth and the transferred compost material 174. The gardener then transfers more of the compost material into the new bottom sub-unit 176 of the second stack. The same process is repeated until the entire composter has been restacked. Alternatively, the entire process can be stopped midway if two smaller composters are desired.

Those skilled in the art will appreciate that numerous variations of the specific embodiments set forth above may be practiced without departing from the spirit of the invention, as claimed below.

What is claimed is:

1. A method for mixing compost, comprising the steps of:

providing a composter comprising a plurality of stackable rectangular sub-units, each sub-unit being comprised of four interlocking double walled plastic panels, wherein each stackable sub-unit has a top edge from which a plurality of protrusions extend, and a bottom edge having protrusion-receiving recesses so that any number of sub-units can be stacked and the stacking order of the sub-units can be readily changed;

stacking the composter sub-units between an original bottom sub-unit and an original top sub-unit over a first piece of earth to form a first stack;

placing biodegradable matter into the first stack;

allowing said biodegradable matter in said first stack to begin decomposing;

removing the original top sub-unit from said first stack and placing it on a second piece of earth to act as the new bottom sub-unit for a second sub-unit stack;

transferring the upper compost layer from said first stack into the new bottom sub-unit of said second stack;

sequentially repeating the two preceding removing and transferring steps for each of the sub-units and corresponding compost layers until the original bottom sub-unit of the first stack becomes the new top sub-unit, so that in the process of reversing the sub-unit stacking order the compost has been substantially mixed.

2. The method of claim 1 wherein in said providing step, said composter further comprises a lid having an under side with a peripheral ridge dimensioned to receive said sub-unit top edge protrusions to hold said lid in place to cover the compost contained within the stacked sub-units, said lid further comprised of two half-portions which are centrally hinged together, allowing one lid halfportion to be opened while leaving the other lid halfportion closed.

* * * * *